T. R. Timby.

Hoe.

Nº 62,574.  Patented Mar. 5, 1867.

Witnesses
Theo Trusch.
J. A. Service.

Inventor.
Theo. R. Timby
Per Munn & Co.
Atty's

United States Patent Office.

THEODORE R. TIMBY, OF SARATOGA SPRINGS, NEW YORK.

Letters Patent No. 62,574, dated March 5, 1867.

IMPROVEMENT IN HOES.

*The Schedule referred to in these Letters Patent and making part of the same.*

TO ALL WHOM IT MAY CONCERN:

Be it known that I, THEODORE R. TIMBY, of Saratoga Springs, in the county of Saratoga, and State of New York, have invented a new and useful Improvement in Hoes; and I do hereby declare that the following is a full, clear, and exact description thereof, which will enable others skilled in the art to make and use the same, reference being had to the accompanying drawings, forming part of this specification, in which—

Figure 3 is an end view of the handle detached.

Similar letters of reference indicate like parts.

Figure 1:
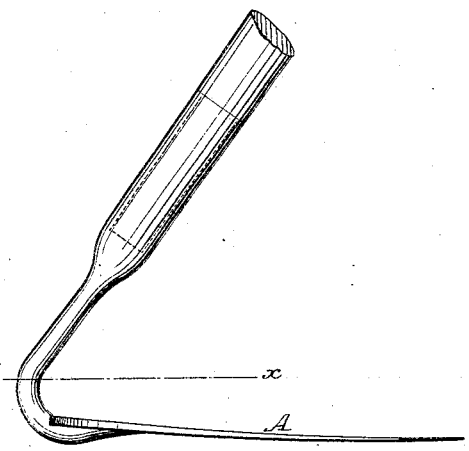
Figure 1 represents a side elevation of this invention.
Figure 2:
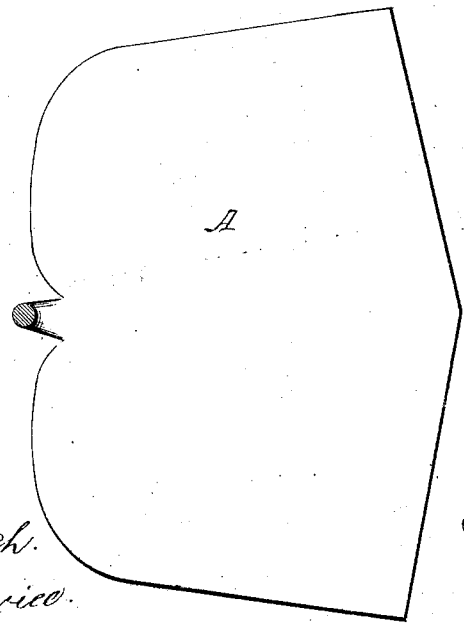
Figure 2 is a horizontal section of the same, taken in the plane indicated by the line $xx$, fig. 1.

This invention relates to a hoe with an angular cutting edge, whereby a hoe is obtained which passes easier into the ground than hoes of the ordinary construction. The handle of the hoe is provided with a hook-shaped abutment or finger-piece which prevents the hand from slipping on the handle, and facilitating the operation of the hoe.

A represents my hoe, the cutting edge of which is made angular, so that the same gradually enters the ground, and opens the same from the centre toward the sides of the hoe, with the greatest ease and facility. By this arrangement a hoe is obtained which works much easier than a hoe of the ordinary construction, and which cuts through weeds and grass without difficulty. The handle B of my hoe is provided with a hook-shaped abutment or finger-piece, C, which is secured to its outer end. By this abutment the hand is prevented from slipping on the handle, and the hoe can be operated with the hand half open, whereas with handles of the ordinary construction the operator is compelled to grasp the handle very firmly, in order to prevent it from slipping, and thereby the hand is tired out. With my improvement the hoe can be handled with the greatest ease, and without tiring out the hand.

Having thus described my invention, I claim as new, and desire to secure by Letters Patent—

1. As an article of manufacture, a hoe with an angular cutting edge, as herein described and represented.
2. The hook-shaped abutment C, in combination with handle B, and hoe A, as set forth.

THEODORE R. TIMBY.

Witnesses:
  WM. F. McNAMARA,
  W. HAUFF.